(12) United States Patent
Wang (10) Patent No.: US 6,896,238 B2
(45) Date of Patent: May 24, 2005

(54) EXTENDED RANGE DIAPHRAGM VALVE AND METHOD FOR MAKING SAME

(75) Inventor: Tak Kui Wang, Saratoga, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 185 days.

(21) Appl. No.: 10/154,169

(22) Filed: May 23, 2002

(65) Prior Publication Data

US 2002/0139947 A1 Oct. 3, 2002

Related U.S. Application Data

(63) Continuation-in-part of application No. 09/553,910, filed on Apr. 20, 2000, now Pat. No. 6,412,751.

(51) Int. Cl.$^7$ ............................................ F16K 31/145
(52) U.S. Cl. ........................ 251/61.2; 251/331; 251/332
(58) Field of Search .............................. 257/331, 335.2, 257/61.1, 61.2, 61, 332

(56) References Cited

U.S. PATENT DOCUMENTS

| | | | |
|---|---|---|---|
| 2,537,308 A | | 1/1951 | Hansen |
| 3,653,408 A | | 4/1972 | Coiner |
| 4,171,792 A | * | 10/1979 | Bass ........................ 251/335.2 |
| 4,312,375 A | | 1/1982 | Leinemann |
| 4,720,079 A | | 1/1988 | Iizuka et al. |
| 4,828,219 A | * | 5/1989 | Ohmi et al. ................. 251/331 |
| 4,869,282 A | | 9/1989 | Sittler et al. |
| 5,065,978 A | * | 11/1991 | Albarda et al. .............. 251/331 |
| 5,083,742 A | * | 1/1992 | Wylie et al. ................. 251/61.1 |
| 5,145,152 A | * | 9/1992 | Komuro et al. .............. 251/331 |
| 5,178,366 A | * | 1/1993 | Kojima et al. ............ 251/335.2 |
| 5,323,999 A | * | 6/1994 | Bonne et al. ................ 251/331 |
| 5,335,691 A | * | 8/1994 | Kolenc ......................... 251/331 |
| 5,926,955 A | * | 7/1999 | Kober ......................... 251/61.1 |
| 5,927,325 A | * | 7/1999 | Bensaoula et al. .......... 251/331 |
| 5,944,050 A | * | 8/1999 | Walker ........................ 251/331 |
| 6,003,835 A | | 12/1999 | Moller |
| 6,056,269 A | * | 5/2000 | Johnson et al. ............. 251/331 |
| 6,102,068 A | | 8/2000 | Higdon et al. |
| 6,595,484 B1 | * | 7/2003 | Gross ........................... 251/331 |

* cited by examiner

*Primary Examiner*—John Bastianelli (57) ABSTRACT

A micro-machined valve assembly includes a valve diaphragm that will not adhere to a valve seat during elevated temperature operation. The valve assembly has a valve seat, a diaphragm suspended over the valve seat, the diaphragm configured to contact the valve seat upon the application of an actuating pressure on the diaphragm. The diaphragm has a continuous film of a first material, where a portion of the first material in a region where the diaphragm contacts the valve seat includes a first metallic material. The absence of an adhesive or the addition of the metal layer extends the operating temperature of the valve by preventing adhesion of the diaphragm to the valve seat during high temperature operation. Selection of an appropriate material for the metal layer can improve chemical inertness of valve, thereby reducing the possibility that the material flowing through the valve will react with the metal.

25 Claims, 9 Drawing Sheets

EXTENDED RANGE DIAPHRAGM VALVE AND METHOD FOR MAKING SAME

CROSS-REFERENCE TO RELATED APPLICATION

This application is a continuation-in-part of commonly assigned U.S. patent application Ser. No. 09/553,910, entitled "EXTENDED RANGE DIAPHRAGM VALVE AND METHOD OF MAKING SAME," filed on Apr. 20, 2000 now U.S. Pat. No. 6,412,751, and is hereby incorporated into this document by reference.

BACKGROUND OF THE INVENTION

Diaphragm valves are useful in many applications. One such application for a diaphragm valve is in a gas chromatograph that is used to perform chemical analysis. Gas chromatography is useful for determining the chemical composition of various materials. It is useful for analyzing minute quantities of complex mixtures from industrial, biological, environmental, and chemical sources. Gas chromatography is also useful for preparing moderate quantities of highly purified compounds otherwise difficult to separate from the mixture in which they occur.

Briefly described, gas chromatography is the process by which the components of a mixture are separated from one another by volatizing the sample into a carrier gas stream that is passed through and over a packed column. A packed column is a tubular gas conduit filled with a bed of packing comprising a 20–200 mesh solid support. The surface of the packing is typically coated with a relatively non-volatile liquid and is known as the stationary phase. Alternatively, the column can be a capillary tube having the stationary phase material coating the inside surface of the tube with no packing material. A carrier gas, such as helium, flows continuously in this column. When a gaseous sample is introduced into an entrance end of the column, the carrier gas carries the sample to the exit, or effluent, end. Different components of the sample under analysis move through the column at different rates due to different affinity and solubility of the components in the sample with respect to the stationary phase, and so appear separately at the effluent end. The time it takes for a specific component to travel from the inlet side of the column to the effluent side of the column is a characteristic of the component.

The effluent end is the end at which the components of the sample are detected. The detection is normally achieved by measuring physical or chemical properties of the effluent. The properties measured include thermal conductivity changes, density differences, optical absorption, or ionic detection. For a sample mixture having multiple components, the detector outputs a signal that can be represented by a pulse train having multiple peaks. The position of each peak relates to the type of the components in the mixture while the area of the peak relates to the quantity of that component in the mixture.

A gas chromatograph can be logically divided into three components. They are the injector, the column, and the detector. The injector measures and delivers a precise quantity of the sample under analysis into the column. The column separates the components in the sample. The detector detects and quantifies the components in the sample.

Because the injector controls the flow of minute quantities of the sample, or gas flow, it is preferably constructed using micro-machining manufacturing techniques. Such techniques allow the injector components to be fabricated to exact dimensions. The sample quantity can be accurately controlled either by a fixed volume or a time injection technique. In fixed volume injection, a fixed volume is first filled with the sample and then injected into the column. For time injection, both the flow rate and the time the sample is allowed to pass onto the column are controlled. In either technique, a set of diaphragm valves is used to control both the carrier, or column, flow and the sample flow. They are used to block and switch direction of the sample flow.

In a conventional diaphragm valve, a circular depression is created on a flat surface. Inside the depression are two valve ports that are connected to separate external fluid connections. A diaphragm fabricated of a flexible material is positioned above the valve ports such that there is a gap between the diaphragm and the surface of the valve ports. Application of an actuating pressure to a surface of the diaphragm opposite the valve ports causes the diaphragm to deflect toward, and contact at least one of the valve ports. This position is known as the off, state of the valve because fluid communication between the ports is blocked. Removal of the actuating pressure returns the valve to its relaxed, or on state. In the on state, the flexible diaphragm returns to its relaxed position, away from the valve ports, thereby exposing the ports and allowing the sample to flow therethrough.

To improve the blockage of fluid flow in the off state, it is desirable that one of the valve ports be located in the center of the depression. It is also desirable that the centrally located valve port include a valve seat. The valve seat is an annular elevation in the well, below the major surface of the wafer in which the ports are formed, and surrounding the centrally located port. Hence, when actuated, the diaphragm will be pushed against the valve seat when in the off state. The valve seat decreases the contact surface area, thus increasing the pressure of the seal when the valve is in the off state.

The flexible diaphragm of a conventional valve can be constructed of a polyimide material such as KAPTON®, which is a registered trademark of the DuPont DeNemours company. The diaphragm may be constructed using either a single layer material, such as KAPTON® HN, VN, FPC, KN, E, EN or A, or may be constructed using a multiple layer material, such as KAPTON® FN, as will be described below.

KAPTON® is a compliant material so that it may easily deflect and seal around the valve seat upon application of the actuating pressure. The diaphragm is sandwiched between a silicon die, which includes the valve ports, and a backing glass. The diaphragm is preferably held in place via an adhesive. If the diaphragm is constructed of a single layer material, then a separate adhesive can be used to bond the diaphragm to the silicon die and the backing glass. Alternatively, the diaphragm can be clamped between the silicon die and the backing glass. Further, the valve may be constructed using other materials, such as stainless steel.

If the diaphragm is constructed of a multiple layer material, the polyimide material from which the diaphragm is constructed can be coated with material that exhibits an adhesive property when the diaphragm is bonded to the silicon die. For example, the adhesive properties may be introduced by raising the temperature of the material. Furthermore, in the case of a single layer material to which adhesive is applied, it is preferable to apply the adhesive on the surfaces of the diaphragm as a continuous thin sheet before applying the diaphragm to the silicon die, which includes the valve ports, and the backing glass.

When implemented as a multiple layer structure, several types of polyimide film are suitable for the diaphragm.

While KAPTON® type FN is preferable, other materials may also be used. KAPTON® type FN comprises a composite structure having a KAPTON® type HN core with a TEFLON® FEP fluorocarbon resin on both surfaces. This fluorocarbon resin is heat sealable, and thus provides the adhesion property that is desirable on the surface of the diaphragm to bond the diaphragm to the silicon die and to the backing glass. During fabrication, the diaphragm may be bonded at elevated temperature and pressure in order to reduce fabrication time. The bonding process can be modified by adjusting the bonding parameters, which include time, temperature and pressure. Thus, bonding at a lower temperature and pressure can be achieved by increasing bonding time. Further, other materials may be used instead of KAPTON® type FN for the diaphragm. For example, any flexible material that exhibits the desired properties can be used.

When implemented as a single layer structure, an adhesive is applied to the surface of the diaphragm or the diaphragm is clamped in place.

Many applications for diaphragm valves require the valves to operate at high temperatures. Because some applications require these valves to normally be maintained in the closed, or off state, the diaphragm is pushed onto the valve seat for extended periods of time. Unfortunately, when using a diaphragm constructed of a material that adopts adhesive properties at elevated temperatures, an increase in operating temperature causes the surface of the diaphragm having the polyimide material to bond to the valve seat. Once this bonding begins to occur, the valve will not operate properly.

Therefore, it would be desirable to prevent bonding between the valve seat and the diaphragm.

SUMMARY OF THE INVENTION

The invention provides an extended range diaphragm valve and method for making same. In one embodiment, the invention is valve assembly, comprising a valve seat, a diaphragm suspended over the valve seat, the diaphragm configured to contact the valve seat upon the application of an actuating pressure on the diaphragm. The diaphragm comprises a continuous film of a first material to which a layer of adhesive is applied, where a portion of the adhesive in a region where the diaphragm contacts the valve seat is removed.

In an alternative embodiment, the invention is a valve assembly comprising a valve seat, a diaphragm suspended over the valve seat, the diaphragm configured to contact the valve seat upon the application of an actuating pressure on the diaphragm. The diaphragm comprises a continuous film of a first material, wherein a portion of the first material in a region where the diaphragm contacts the valve seat includes a first metallic material.

Other features, methods and advantages in addition to or in lieu of the foregoing are provided by certain embodiments of the invention, as is apparent from the description below with reference to the following drawings.

BRIEF DESCRIPTION OF THE DRAWINGS

The present invention, as defined in the claims, can be better understood with reference to the following drawings. The components within the drawings are not necessarily to scale relative to each other, emphasis instead being placed upon clearly illustrating the principles of the present invention.

DETAILED DESCRIPTION OF THE INVENTION

Embodiments of the invention to be described hereafter with particular reference to a micro-machined valve fabricated on a silicon wafer is applicable to all diaphragm valves that employ a diaphragm that comes into contact with a valve seat during fabrication and operation. Furthermore, while described below as part of an injector for a gas chromatograph, a diaphragm valve constructed in accordance with the various embodiments of the invention has many different applications and is not intended to be limited to use in a gas chromatograph. Furthermore, the concepts of the invention are applicable to various diaphragm and valve seat materials.

Figure 1:
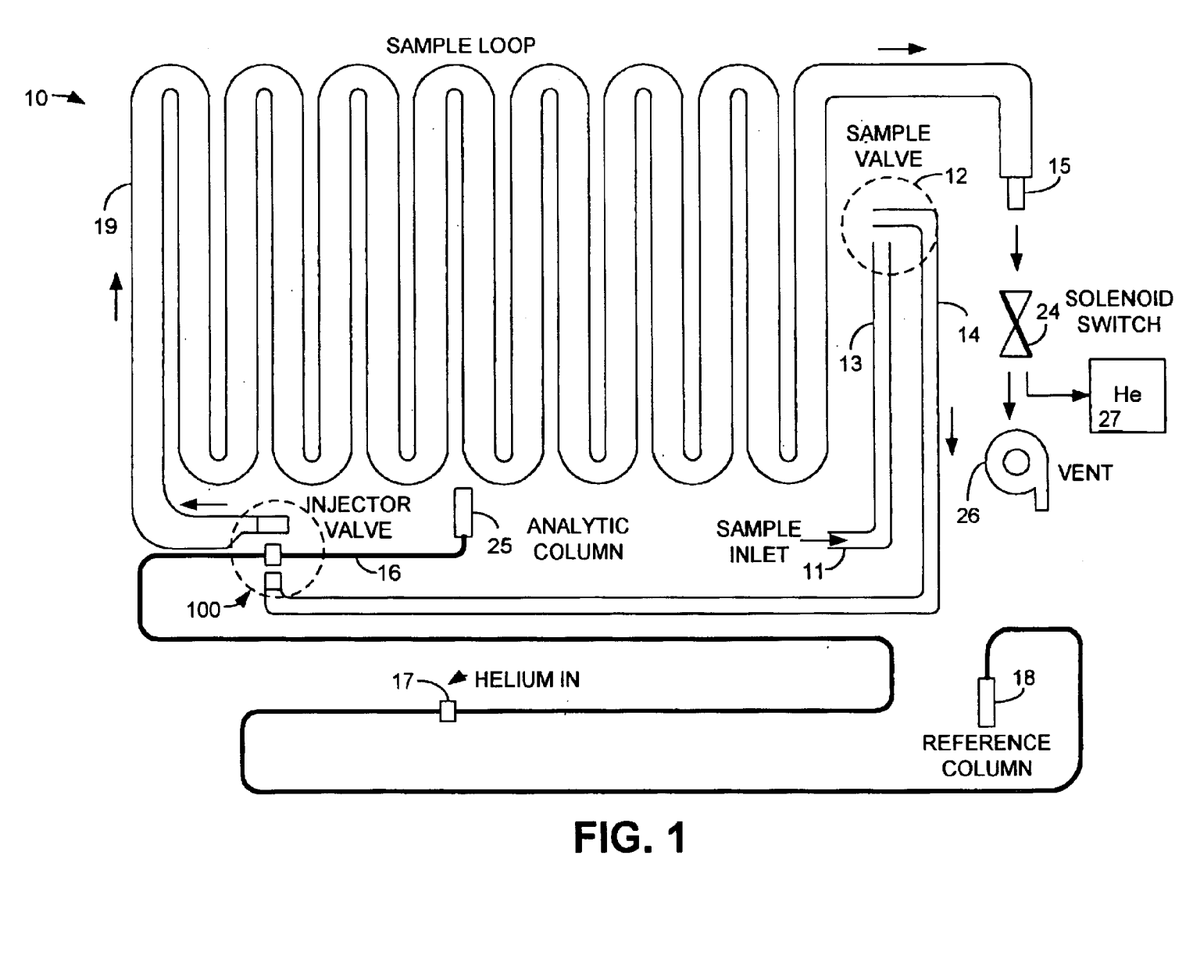
FIG. 1 is a schematic view illustrating the basic components of an injector including the valve assembly of the present invention.

Turning now to the drawings, FIG. 1 is a schematic view illustrating the basic components of an injector 10 of a gas chromatograph. The injector 10 is designed to inject a known volume of a sample into a column by controlling the flow of the sample, and controlling the time during which the sample flows into the column. Only the basic components of the injector 10 are illustrated. Injector 10 includes sample valve 12 and injector valve assembly 100. Although sample valve 12 and injector valve assembly 100 may be constructed in accordance with the invention, only injector valve assembly 100 (hereafter referred to as valve assembly 100) will be explained in detail below.

Nominally, valve assembly 100 and sample valve 12 are both in the off state A carrier, such as helium, is introduced through port 17 and flows in two directions. One of the flows goes to port 18 and into a reference column. The other flow goes through path 16, through port 25 into the analytic column. The analytic column is the column having the stationary phase into which the sample is introduced. Following is an illustration of the manner in which a sample is introduced into the column.

Injector 10 includes sample inlet 11 through which a sample to be analyzed is introduced. When sample valve 12 is open and valve assembly 100 is closed, the sample is drawn through paths 13 and 14 into the, sample loop 19. This is accomplished by energizing solenoid switch 24, which connects port 15 to vacuum pump 26. The action of vacuum pump 26 draws the sample into the sample loop 19. The entire sample path is now filled with the sample. Next, the vacuum pump 26 is deactivated and sample valve 12 is turned off. Next, the solenoid switch 24 connects port 15 to a helium gas source 27, which is at a higher pressure than the helium pressure at port 17. Hence, the sample in paths 14 and 19 is compressed. After a stabilization time on the order of 50 msec, the injector valve 100 is opened for a predetermined period of time, referred to as the injection time, allowing the sample to flow into path 16 and out through port 25 into the analytic column. After the injection time has elapsed, the injector valve 100 is again closed, separating the sample flow path from the helium flow path. The solenoid switch 24 again connects port 15 to the vacuum pump 26. The product of the injection time and the sample flow rate is the injection volume. This process repeats when a new sample is analyzed.

Figure 2:
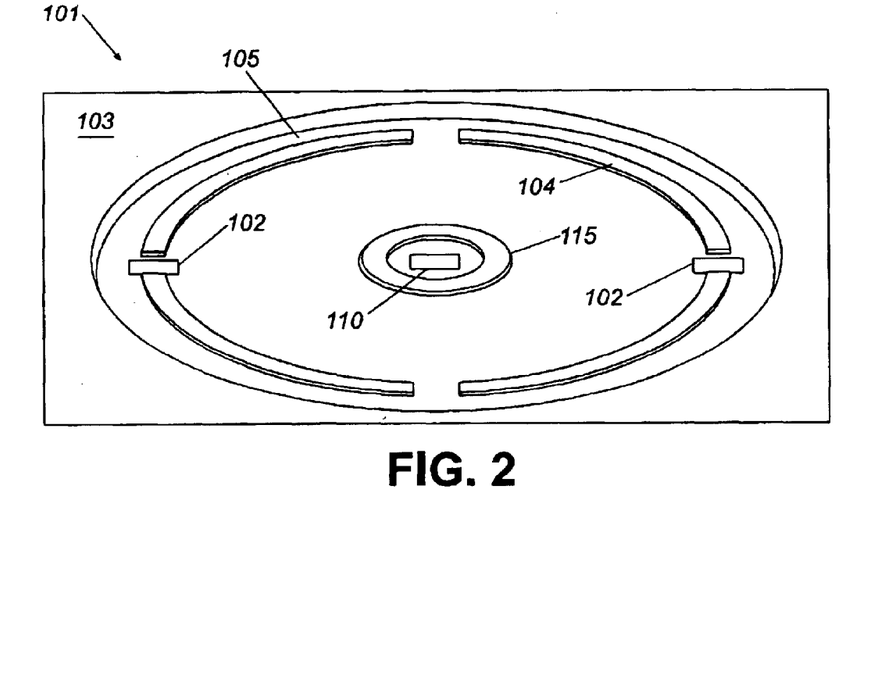
FIG. 2 is a perspective view illustrating a portion of the valve assembly of FIG. 1.

FIG. 2 is a perspective view illustrating a portion of the valve assembly 100 of FIG. 1. Valve assembly 100 is fabricated using micro-machined manufacturing techniques, and a portion of valve assembly 100 is therefore fabricated on a silicon wafer. As shown in FIG. 2, valve portion 101 includes wafer surface 103 and wafer surface 105, which is machined to include a number of ports. Alternatively, the valve assembly 100 can be fabricated from other materials, such as glass or stainless steel.

By operation of the valve assembly 100 to be described below, samples will pass through the ports of valve assembly 100. Wafer surface 105 includes an active port 110, machined therethrough and a number of passive ports 102 also machined therethrough, preferably oriented as shown in FIG. 2. The number of ports shown in FIG. 2 is for example only. More or fewer valve ports may be included in valve assembly 100. For example, the sample valve 12 of FIG. 1 has only one passive port whereas the injector valve assembly 100 of FIG. 1 has two passive ports. Active port 110 is the port that is controlled by the diaphragm constructed in accordance with the invention and to be described in further detail below.

Passive ports 102 are holes machined in the wafer surface 105 through which the sample admitted through active port 110 can flow. Alternatively, the sample may enter through passive ports 102 and exit through active port 110. When the active port 110 is closed, the sample may flow between the passive ports.

Active port 110 includes valve seat 115, which is a raised surface with respect to wafer surface 105. Ridge 104 is also a raised surface with respect to wafer surface 105. Wafer surface 105 is recessed with respect to wafer surface 103. The height of valve seat 115 and ridge 104 falls between wafer surface 105 and wafer surface 103 so that a diaphragm constructed in accordance with the invention can be supported by wafer surface 103 as will be more fully described below with respect to FIG. 5.

Figure 3:
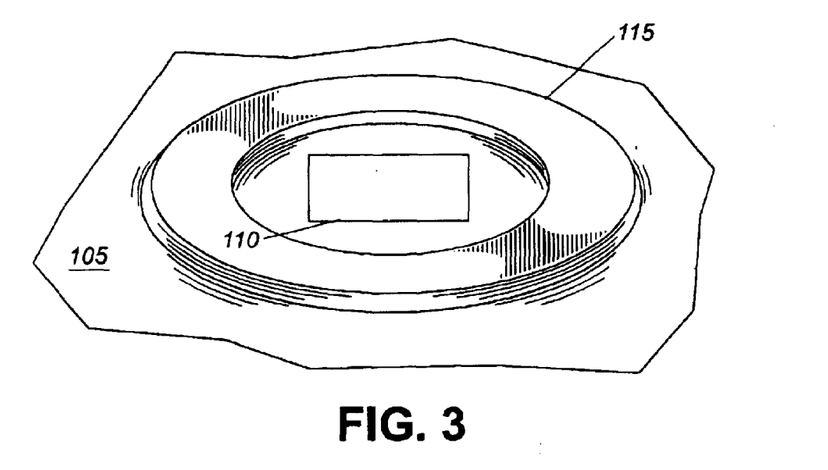
FIG. 3 is a perspective view illustrating the active port of FIG. 2.

FIG. 3 is a perspective view illustrating the active port 110 of FIG. 2. As illustrated in FIG. 3, active port 110 is machined so that it is within the region defined by valve seat 115 on wafer surface 105.

Figure 4:
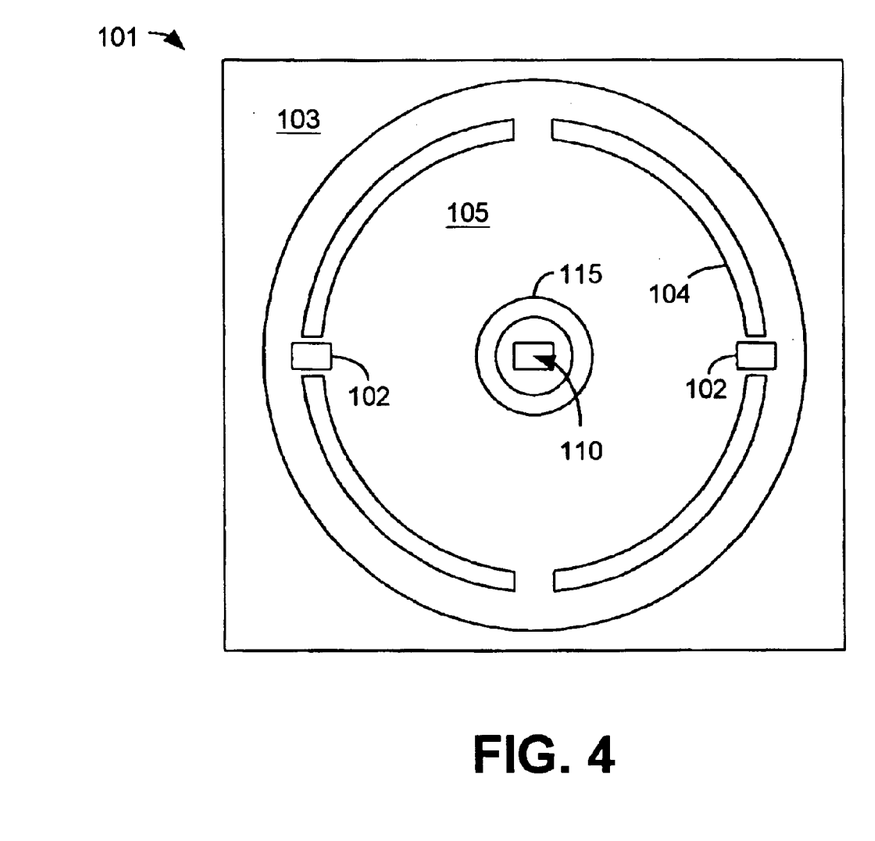
FIG. 4 is a plan view illustrating a portion of the valve assembly shown in FIG. 2.

FIG. 4 is a plan view illustrating the portion 101 of valve assembly 100 shown in FIG. 2. The portion 101 of valve assembly 100 includes wafer surface 103, which in the preferred embodiment is silicon, into which active port 110 and exit ports 102 are formed. A brief description of the steps used to create the structure of FIG. 4 follows. Performing a first isotropic wet etching technique on wafer surface 103 forms the structure.

The etching step creates a circular depression that includes the area defined by wafer surface 105, passive ports 102, ridge 104, valve seat 115, and active port 110. The depression is typically 25 µm deep. The first etch step is followed by a second etch step, which includes only wafer surface 105. Hence, the upper surface of ridge 104 and the upper surface of valve seat 115 reside above wafer surface 105 but below wafer surface 103.

Etching from a reverse surface of the wafer using anisotropic etching techniques forms active port 110 and passive ports 102. The ridge 104 is formed so as to prevent the diaphragm from covering the passive ports 102 when the diaphragm contacts the valve seat 115 and the ridge 104. The ridge 104 allows fluid communication between the passive ports 102. It is understood that this valve structure can be formed by any other technique, for example but not limited to, etching, cutting, or other micro-machining or diaphragm valve manufacturing techniques. In this manner, a diaphragm, to be described below, having one surface is affixed to the surface 103 will not contact valve seat 115 or ridge 104 unless an actuating pressure is applied to the opposing surface of the diaphragm.

Figure 5:
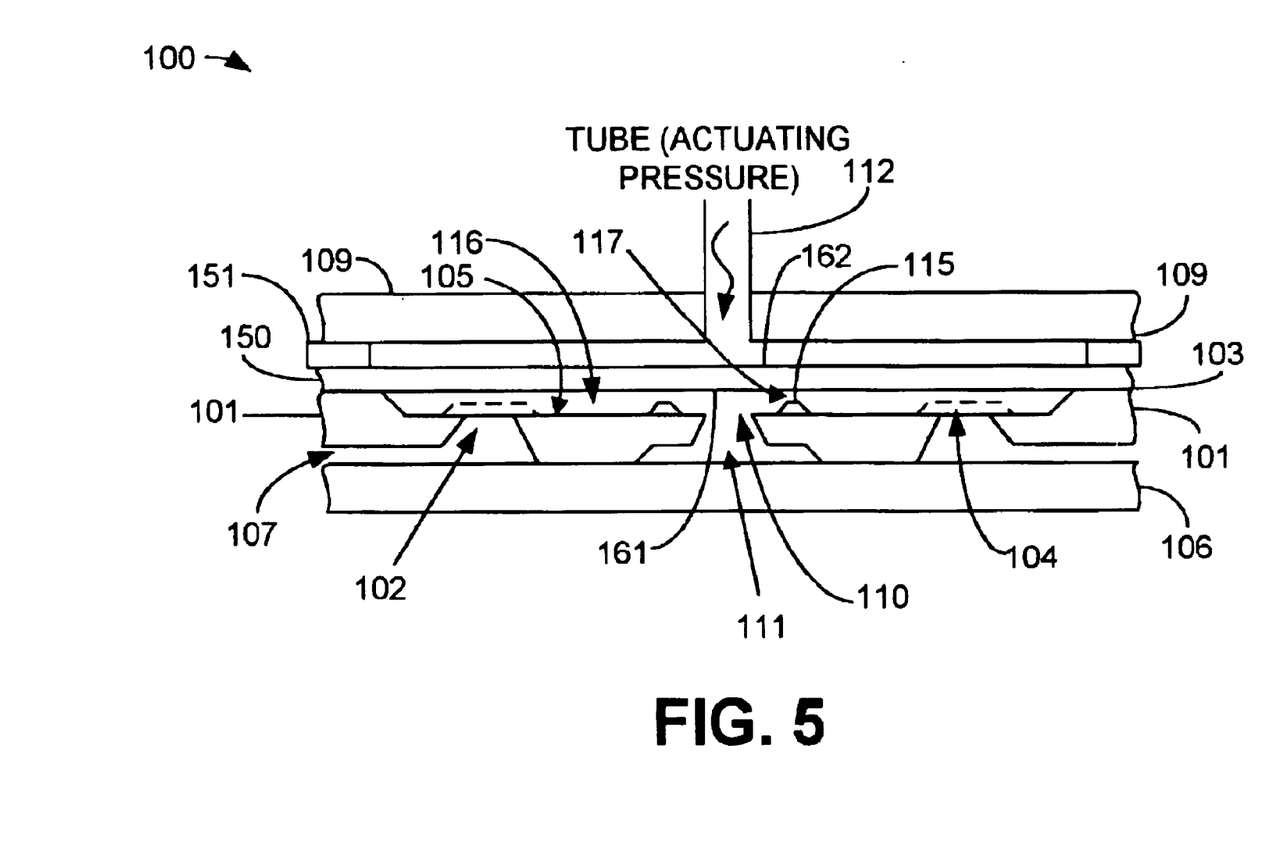
FIG. 5 is a cross-sectional view of the valve assembly of FIG. 1.

FIG. 5 is a cross-sectional view of valve assembly 100 of FIG. 1. A glass substrate 106 provides mechanical support for valve assembly 100. Sample flow channel 107 corresponds to path 14 of FIG. 1 through which the sample under analysis is introduced through sample valve 12 (FIG. 1). The carrier flow channel 111 is shown only as a cross-section of the channel because it is fabricated at a right angle to the view shown. A carrier gas, typically helium, flows in channel 111, which corresponds to the flow path 16 of FIG. 1.

The active port 110 resides in the region defined by the interior portion of valve seat 115. The surface of valve seat 115 and the surface of ridge 104, reside at a level higher than the surface 105, but lower than the silicon wafer surface 103. When the surface 161 of valve diaphragm 150 rests on the surface of valve seat 115, fluid communication between the active port 10 and the passive ports 102 is blocked. The ridge 104 supports the diaphragm such that the ports 102 are not blocked. Fluid communication between the passive ports is still possible. The ridge 104 is illustrated using a dashed line to indicate that the ridge does not exist over passive ports 102 (see FIG. 4).

Glass portions 109 reside over valve diaphragm 150 separated therefrom by spacer 151. Spacer 151 is preferably constructed using a polyimide material similar to that of the diaphragm 150. Tube 112 brings actuating pressure to the surface 162 of valve diaphragm 150 opposite surface 161. As shown in FIG. 5, the valve diaphragm 150 is in a relaxed, or non-actuated state, thereby allowing a gap 117 to exist between the surface of valve seat 115 and the surface 161 of valve diaphragm 150. In this state, fluid communication between the active port 110 and the passive ports 102 is possible. Upon the application of actuating pressure to the surface 162 of valve diaphragm 150 via tube 112, the valve diaphragm 150 will be deflected so that the surface 161 of valve diaphragm 150 contacts the surface of valve seat 115, thereby closing valve assembly 100. In this manner, the flow of material through active port 110 is prevented.

Figure 6A:
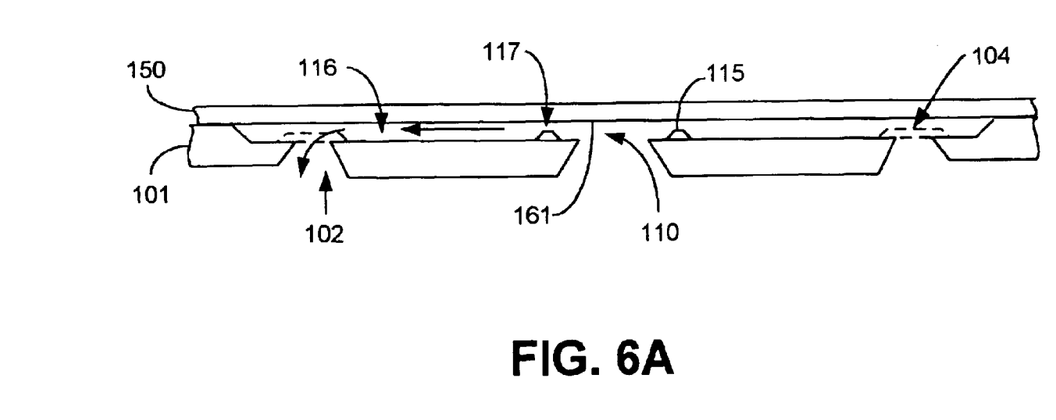
FIG. 6A is a cross-sectional view illustrating the valve diaphragm of FIG. 5 in a relaxed position.

FIG. 6A is a cross-sectional view illustrating the valve diaphragm 150 of FIG. 5 in a relaxed position. As shown in FIG. 6A, when valve diaphragm 150 is in a relaxed position, a gap 117 exists between the surface of valve seat 115 and the surface 161 of valve diaphragm 150. In this manner, a sample introduced to active port 110 can pass through the gap 117 and through the cavity 116 for exit through exit port 102.

Figure 6B:
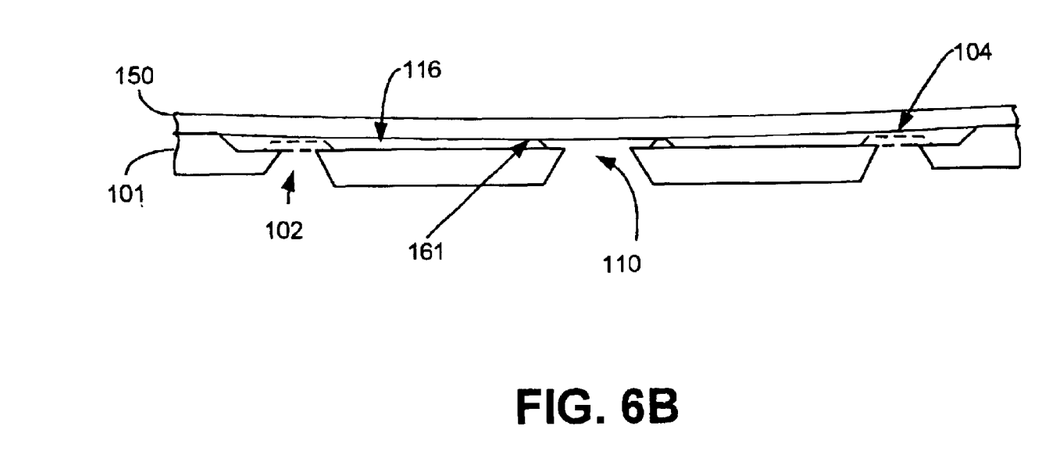
FIG. 6B is a cross-sectional view illustrating the valve diaphragm of FIG. 5 in an extended, or actuated, position.

FIG. 6B is a cross-sectional view illustrating the valve diaphragm 150 of FIG. 5 in an extended, or actuated, position. Upon the application of actuating pressure through tube 112 (not shown in FIG. 6B), the surface 161 of valve diaphragm 150 comes into contact with the surface of valve seat 115. In this manner, the gap 117 between the surface 116 of valve diaphragm 150 and the surface of valve seat 115 is eliminated, thereby preventing the flow of material from active port 110 into cavity 116. In this manner, the valve assembly 100 controls the flow of material through the active port 110.

In conventional valve assemblies, the valve diaphragm 150 that contacts valve seat 115 may comprise a composite material, such as KAPTON® FN. Under elevated temperature and pressure, the outer layer of the KAPTON® FN, which is an FEP thin film, can adhere to glass, silicon (such as the surface of valve seat 115) and to itself. In this manner, the valve diaphragm 150 and the spacer 151 can be bonded to the silicon portion 101 and glass portions 109 (see FIG. 5). If the diaphragm is implemented as a single layer structure, adhesive is typically applied so the diaphragm can be secured to the silicon portion 101 and glass portions 109. Single layer diaphragm material includes KAPTON® Type E and EN. Typical adhesives are acrylic, epoxy-amide, epoxy-novolac, phenolicbutyral and phenolic-nitrile, as known to those having ordinary skill in the art. Unfortunately, there is no convenient way to apply the adhesive to the diaphragm without covering the portion of the diaphragm that will contact the valve seat with adhesive.

Alternatively, the diaphragm can be clamped between the silicon portion 101 and the glass portions 109, thereby eliminating the adhesive.

Unfortunately, regardless of the construction of the valve diaphragm 150, when bonding to glass or silicon, the bonding temperature of this film can be below 130° C. under elevated pressure and given sufficient time. This is problematic during the operation of the valve when, in order to volatize a sample, the injector and the valve assembly 100 are heated to temperatures in excess of 130° C. Thus, the diaphragm 150 can soften and cause the adhesive on the valve diaphragm 150 to adhere to the surface of valve seat 115.

Figure 7A:
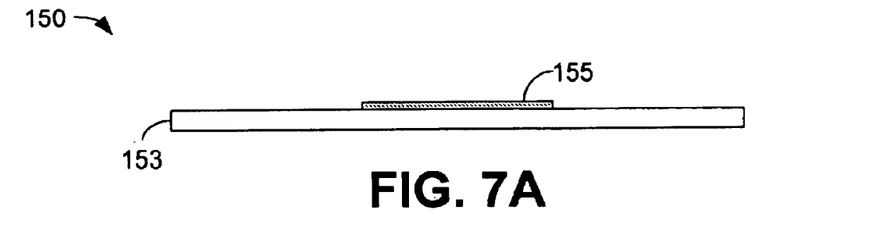
FIG. 7A is cross-sectional view illustrating a valve diaphragm constructed in accordance with one embodiment of the invention.

FIG. 7A is cross-sectional view illustrating a valve diaphragm 150 constructed in accordance with one embodiment of the invention. Valve diaphragm 150 comprises a layer of a first material 153, which can be, for example, the polyimide material KAPTON® HN, over which a metallic material 155 is deposited. The polyimide layer of first material 153 is typically 50 $\mu$m thick. The metallic material can be, for example, gold, or a gold containing alloy, and can be applied to a thickness of approximately 100 nanometers (nm) approximately as shown.

The thickness of the metallic material 155 is very thin compared to the thickness of the diaphragm, and therefore, will not affect the operation of the diaphragm. In this manner, the metallic material 155, which is inert and applied over the first material 153, will not adhere to the valve seat 115 and will not react with most samples.

Alternatively, a metallic layer of tantalum, aluminum or nickel may be used instead of gold. The selective deposition of thin metal layers on polyimide material is known to those having ordinary skill in the art. One example is evaporation through a shadow mask. These shadow masks are generally constructed of metal foils having openings. Thus, if the shadow mask is placed between the evaporating source and the diaphragm, only the area of the diaphragm that has direct exposure to the evaporating source will have metal deposited thereon. The rest of the area is in the shadow. Similarly, selective deposition can be effected using a sputtering system.

Figure 7B:
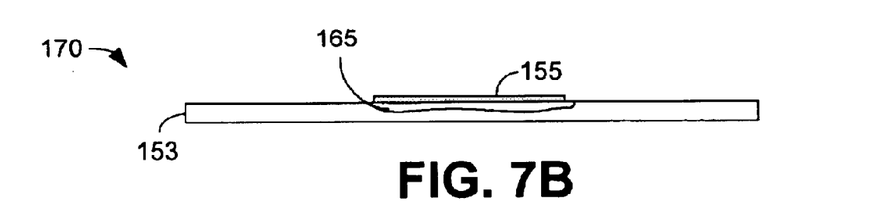
FIG. 7B is a cross-sectional view illustrating a valve diaphragm constructed in accordance with an alternative embodiment of the invention.

FIG. 7B is a cross sectional view illustrating a valve diaphragm 170 constructed in accordance with another embodiment of the invention. Valve diaphragm 170 is constructed so that a portion of layer 153 is activated in the region 165. Those having ordinary skill in the art should understand that such activation can be achieved by processes such as plasma etching of the surface. This activation improves the adhesion of the metallic material 155 to the diaphragm in the region 165 when the deposition of the metal is carried out immediately after the activation process. A shadow mask similar to one that can be used to selectively deposit metal on the diaphragm can be used to control activation only in region 165 of the diaphragm. Here, only the regions that are exposed via the holes in the shadow mask become activated.

Figure 7C:
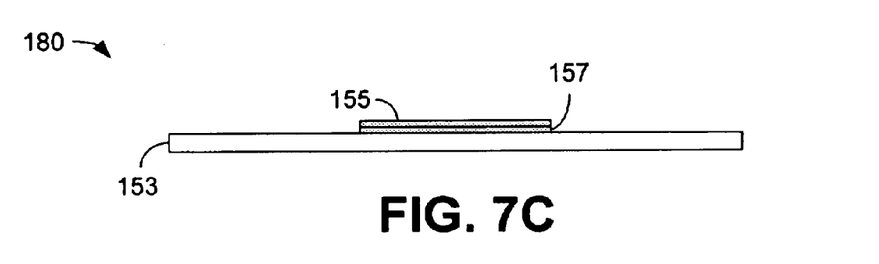
FIG. 7C is a cross sectional view illustrating a valve diaphragm constructed in accordance with another embodiment of the invention.

FIG. 7C is a cross-sectional view illustrating a valve diaphragm 180 constructed in accordance with another embodiment of the invention. In accordance with this embodiment, after the activation of a portion of layer 153 in the region 165 (FIG. 7B) as described above, a second metallic material 157, preferably comprising a 50 nm layer of nichrome, is applied to layer 153 prior to the application of metallic material 155. Alternatively, the second metallic material may include a titanium-tungsten alloy, which is used as a standard adhesion material in the integrated circuit manufacturing industry, and may also include titanium and chromium. The second metallic material 157 can be referred to as an "adhesion layer" and may improve the adhesion between the metallic material 155 and the material of layer 153. When the second metallic material 157 is applied, the gold that comprises the metallic material 155 may be electroplated thereon. As mentioned above, the thickness of the metallic material 155 and the second metallic material 157 are such that operation of the diaphragm is unimpeded.

Figure 7D:
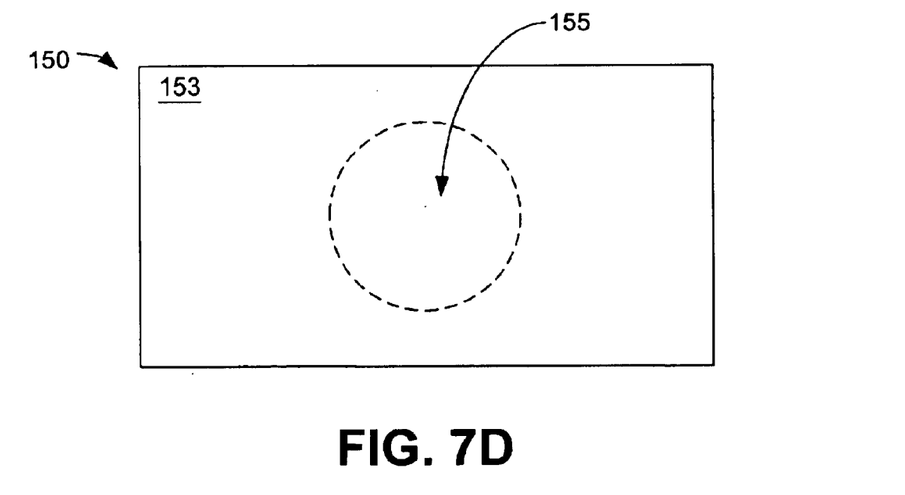
FIG. 7D is a plan view illustrating the valve diaphragm of FIG. 7A.

FIG. 7D is a plan view illustrating the valve diaphragm 150 of FIG. 7A. Shown is a surface of the material layer 153, to which a metallic material 155 has been applied in the vicinity of the diaphragm 150 that will contact the valve seat 115. In this manner the valve assembly 100 constructed in accordance with this embodiment of the invention can be operated at significantly higher temperature than previously possible. When constructed in accordance with that shown in FIGS. 7A through 7C, the metallic material 155 will contact the valve seat 115, thereby allowing operation at elevated temperatures.

In this manner, a valve diaphragm constructed in accordance with this embodiment of the invention can be fabricated and operated at temperatures significantly higher than 130° C., while eliminating the possibility that the layer 153 will adhere to the surface of valve seat 115. Alternatively, the metallic material 155 can be applied over any suitable valve diaphragm material.

Figure 8A:
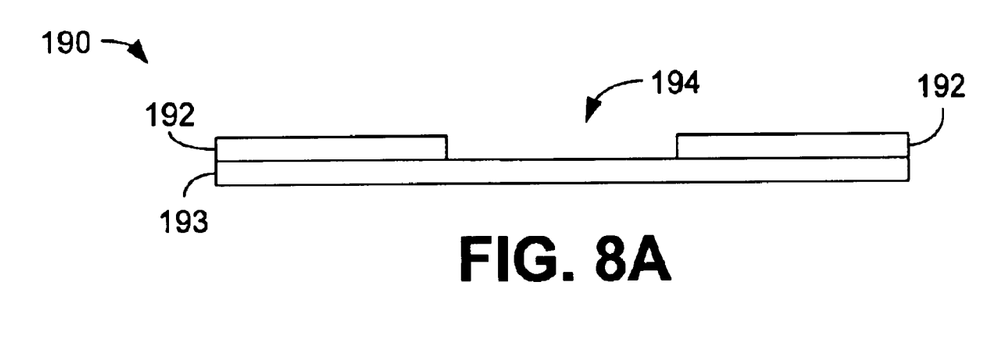
FIG. 8A is cross-sectional view illustrating a valve diaphragm constructed in accordance with another embodiment of the invention.

FIG. 8A is cross-sectional view illustrating a valve diaphragm 190 constructed in accordance with another embodiment of the invention. Valve diaphragm 190 comprises a layer of a first material 193, which can be, for example, the polyimide material KAPTON® HN or any other material from which a diaphragm can be constructed, over which an adhesive material 192 is deposited. The layer of first material 193 is typically 50 μm thick. The adhesive material 192 is applied as a layer over the first material layer 193 and then removed in the region 194 where the valve diaphragm 193 will contact the valve seat 115.

Figure 8B:
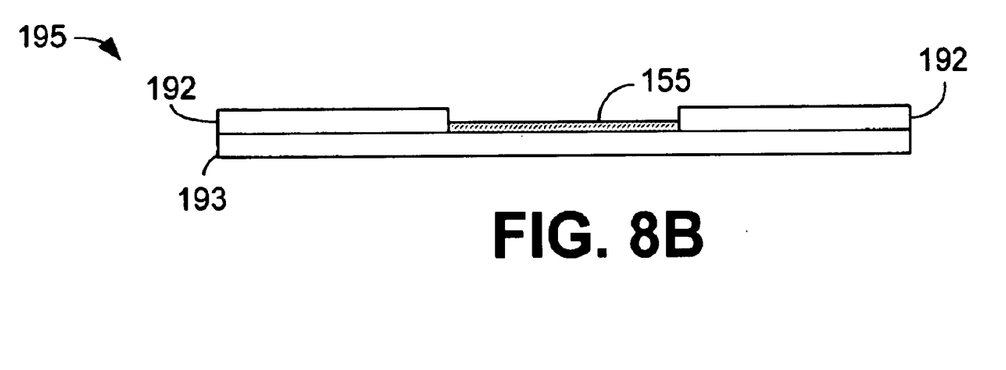
FIG. 8B is cross-sectional view illustrating a valve diaphragm constructed in accordance with another embodiment of the invention.

FIG. 8B is cross-sectional view illustrating a valve diaphragm 195 constructed in accordance with another embodiment of the invention. Valve diaphragm 195 is similar to the valve diaphragm 190, but includes a layer of metallic material 155 applied in the region 194 (FIG. 8A) where the valve diaphragm 195 will contact the valve seat 115. The metallic material can be, for example, gold, or a gold containing alloy, and can be applied to a thickness of approximately 100 nanometers (nm) approximately as shown.

The thickness of the metallic material 155 is very thin compared to the thickness of the diaphragm, and therefore, will not affect the operation of the diaphragm. In this manner, the metallic material 155, which is inert and applied over the first material 193 will not adhere to the valve seat 115 and will not react with most samples.

Figure 9A:
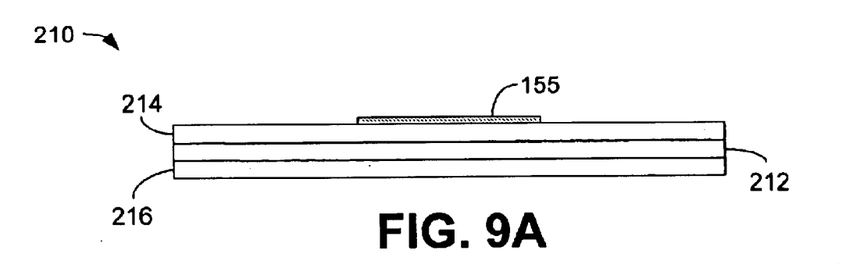
FIG. 9A is cross-sectional view illustrating a valve diaphragm constructed in accordance with another embodiment of the invention.

FIG. 9A is cross-sectional view illustrating a valve diaphragm 210 constructed in accordance with another embodiment of the invention. Valve diaphragm 210 includes a layer of a first polyimide material 212, for example, KAPTON® HN, sandwiched between a first layer 214 and a second layer 216 of an adhesive material, such as TEFLON® FEP. Although shown in FIG. 8A as being of equal thickness, typically, the polyimide layer 212 is 50 μm and the FEP layers 214 and 256 are 12.5 μm.

In accordance with this embodiment of the invention, a metallic material 155, preferably comprising a layer of gold 100 nm, thick is applied over polyimide layer 214 approximately as shown. The thickness of the metallic material 155 is very thin compared to the thickness of the diaphragm, and therefore, will not affect the operation of the diaphragm. In this manner, the metallic material 155, which is inert and applied over layer 214 will not adhere to the valve seat 115 and will not react with most samples. Alternatively, a first metal layer of tantalum, aluminum or nickel may be used instead of gold. To fabricate this embodiment, the layer 214 is covered with a shadow mask, the valve diaphragm 210 is placed in a sputtering system, and the metallic material 155 is deposited by sputtering. Alternatively, the metallic material can be deposited by evaporation through a shadow mask.

Figure 9B:
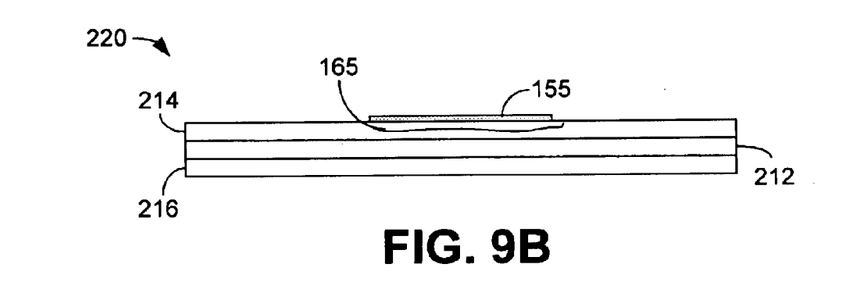
FIG. 9B is a cross-sectional view illustrating a valve diaphragm constructed in accordance with an alternative embodiment of the invention.

FIG. 9B is a cross sectional view illustrating a valve diaphragm 220 constructed in accordance with another embodiment of the invention. Valve diaphragm 220 is constructed so that a portion of layer 214 is activated in the region 165. As mentioned above, those having ordinary skill in the art should understand that such activation can be achieved by processes such as plasma etching of the surface. As further described above, this activation improves the adhesion of the metallic material 155 to the diaphragm in the region 165. A shadow mask similar to one that can be used to selectively deposit metal on the diaphragm can be used to control activation only in region 165 of the diaphragm. Here, only the regions that are exposed via the holes in the shadow mask become activated. To fabricate this embodiment, the layer 214 is covered with a shadow mask, the valve diaphragm 210 is placed in a sputtering system, the layer 214 is activated with a plasma, and the metallic material 155 is deposited by sputtering.

Figure 9C:
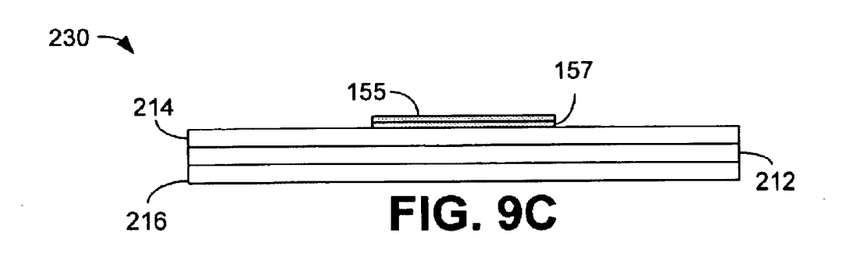
FIG. 9C is a cross sectional view illustrating a valve diaphragm constructed in accordance with another embodiment of the invention.

FIG. 9C is a cross-sectional view illustrating a valve diaphragm 230 constructed in accordance with another embodiment of the invention. In accordance with this embodiment, after the activation of a portion of layer 214 in the region 165 (FIG. 8B) as described above, the second metallic material 157, preferably comprising a 50 nm layer of nichrome, is applied to layer 214 prior to the application of metallic material 155. Alternatively, the second metallic material may include a titanium-tungsten alloy, which is used as a standard adhesion material in the integrated circuit manufacturing industry, and may also include titanium and chromium. The second metallic material 157 can be referred to as an "adhesion layer" and may improve the adhesion between the metallic material 155 and the material of layer 214. When the second metallic material 157 is applied, the gold that comprises the metallic material 155 may be electroplated thereon. As mentioned above, the thickness of the metallic material 155 and the second metallic material 157 are such that operation of the diaphragm is unimpeded. To fabricate this embodiment, the layer 214 is covered with a shadow mask, the valve diaphragm 210 is placed in a sputtering system, the layer 214 is activated with a plasma, the second metallic material 157 is deposited by sputtering, and the metallic material 155 is deposited by sputtering.

Figure 10A:
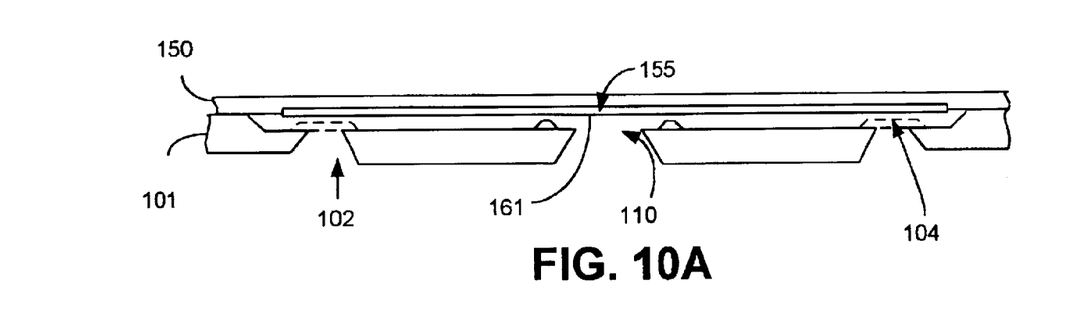
FIG. 10A is cross-sectional view of a diaphragm valve including a diaphragm constructed in accordance with the embodiment of the invention shown in FIGS. 7A through 7D.
Figure 10B:
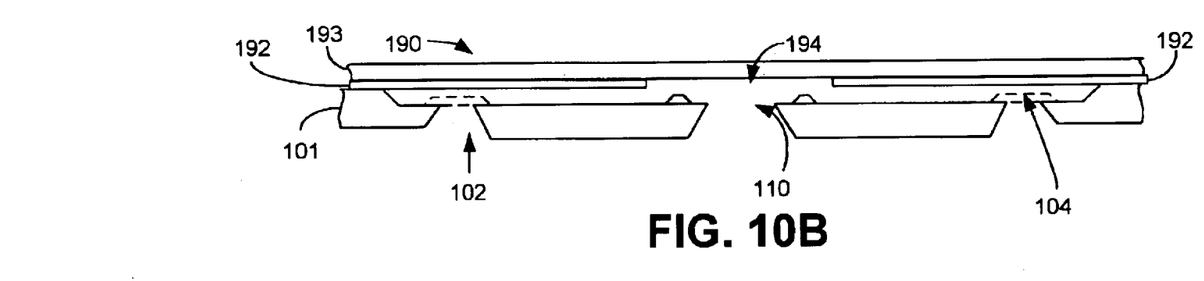
FIG. 10B is a cross-sectional view illustrating the diaphragm valve constructed in accordance with the embodiment of the invention shown in FIGS. 8A and 8B.
Figure 10C:
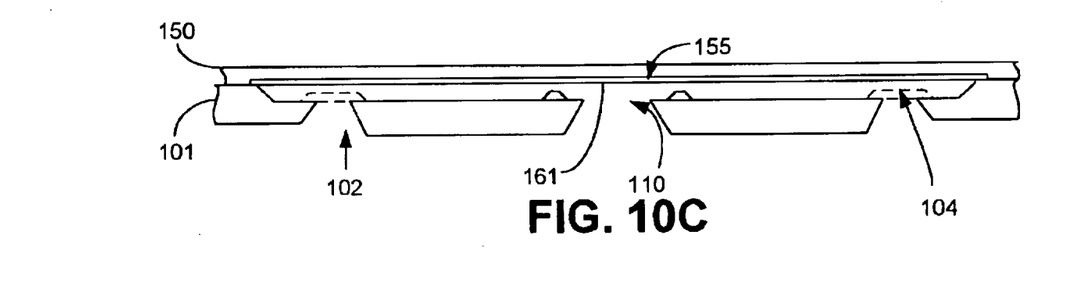
FIG. 10C is a cross-sectional view illustrating the diaphragm valve constructed in accordance with the embodiment of the invention shown in FIGS. 9A through 9C.

FIGS. 10A, 10B, and 10C are cross-sectional views illustrating a valve assembly 100 including three alternative embodiments of the construction of the diaphragm valves 150, 170 and 180 of FIGS. 7A, 7B and 7C, respectively; diaphragm valves 190 and 195 of FIGS. 8A and 8B, respectively, and diaphragm valves 210, 220 and 230 of FIGS. 9A, 9B and 9C, respectively. In FIG. 10A, the metallic material 155 extends from the center of the valve to just beyond the ridge 104. In FIG. 10B, the portion 194 of the valve diaphragm 190 that contacts the valve seat 115 is free of adhesive material 192.

In FIG. 10C, the first metal layer 155 extends onto the surface 103 of the silicon wafer 101. In the embodiment shown in FIG. 10C, any contact between the sample gas and layer 153 of diaphragm 150 is prevented. This may be desirable for certain types of samples.

It will be apparent to those skilled in the art that many modifications and variations may be made to the preferred embodiments of the present invention, as set forth above, without departing substantially from the principles of the present invention. For example, the present invention can be used with a number of different micro-machined valve configurations, constructed using materials different from those described herein, and a number of different diaphragm valves. Furthermore, the dimensions provided herein are for example purposes only. All such modifications and variations are intended to be included herein within the scope of the present invention, as defined in the claims that follow.

What is claimed is:

1. A valve assembly, comprising:

a valve seat;

a diaphragm suspended over said valve seat, the diaphragm configured to contact the valve seat upon the application of an actuating fluid pressure on the diaphragm, the diaphragm comprising a continuous film of a first material; and wherein a portion of the first material in a region where the diaphragm contacts the valve seat includes a first metallic material, wherein the first metallic material is a thin film and is thinner than the continuous film of the first material.

2. The valve assembly of claim 1, wherein the portion of the first material in the region where the diaphragm contacts the valve seat is activated under the first metallic material.

3. The valve assembly of claim 2, further comprising a second metallic material applied between the first metallic material and the first material.

4. The valve assembly of claim 2, wherein the first metallic material is gold.

5. The valve assembly of claim 2, wherein the first metallic material is chosen from the group consisting of tantalum, aluminum and nickel.

6. The valve assembly of claim 3, wherein the second metallic material is chosen from the group consisting of nichrome, titanium and chromium.

7. The valve assembly of claim 1, wherein the material for the valve seat is chosen from the group consisting of silicon, glass and stainless steel.

8. The valve assembly of claim 1, wherein the continuous film of the first material includes an adhesive property.

9. The valve assembly of claim 1, wherein the diaphragm comprises a three layer structure.

10. A method for making a valve assembly, the method comprising the steps of:

forming a valve seat in a substrate material;

suspending a diaphragm over said valve seat, the diaphram configured to contact the valve seat upon the application of an actuating fluid pressure on the diaphragm, the diaphragm comprising a continuous film of a first material; and covering a portion of the first material in a region where the diaphragm contacts the valve seat with a first metallic material, wherein the first metallic material is a thin film and is thinner than the continuous film of the first material.

11. The method of claim 10, further comprising the step of activating the portion of the first material in the region where the diaphragm contacts the valve seat under the first metallic layer.

12. The method of claim 11, further comprising the step of applying a second metallic material between the first metallic material and the first material.

13. The method of claim 11, wherein the first metallic material is gold.

14. The method of claim 11, wherein the first metallic material is chosen from the group consisting of tantalum, aluminum and nickel.

15. The method of claim 12, wherein the second metallic material is chosen from the group consisting of nichrome, titanium and chromium.

16. The method of claim 10, wherein material for the valve seat is chosen from the group consisting of silicon, glass and stainless steel.

17. The method of claim 10, wherein the continuous film of the first material includes an adhesive property.

18. A valve assembly for use in a gas chromatograph, the valve assembly comprising:

a substrate material;

a valve seat formed in said substrate material;

a diaphragm suspended over said valve seat, the diaphragm configured to contact the valve seat upon the application of an actuating fluid pressure on the diaphragm, the diaphragm comprising a continuous film of a first material; and wherein a portion of the first material in a region where the diaphragm contacts the valve seat includes a first metallic material, wherein the first metallic material is a thin film and is thinner than the continuous film of the first material.

19. The valve assembly of claim 18, wherein the portion of the first material in the region where the diaphragm contacts the valve seat is activated under the first metallic layer.

20. The valve assembly of claim 19, further comprising a second metallic material applied between the first metallic material and the first material.

21. The valve assembly of claim 19, wherein the first metallic material is gold.

22. The valve assembly of claim 19, wherein the first metallic material is chosen from the group consisting of tantalum, aluminum and nickel.

23. The valve assembly of claim 20, wherein the second metallic material is chosen from the group consisting of nichrome, titanium and chromium.

24. The valve assembly of claim 18, wherein the continuous film of the first material includes an adhesive property.

25. The valve assembly of claim 18, wherein the diaphragm comprises a three layer structure.

* * * * *

UNITED STATES PATENT AND TRADEMARK OFFICE
CERTIFICATE OF CORRECTION

PATENT NO. : 6,896,238 B2 Page 1 of 1
DATED : May 24, 2005
INVENTOR(S) : Wang

It is certified that error appears in the above-identified patent and that said Letters Patent is hereby corrected as shown below:

Column 11,
Lines 39-40, delete "diaphram" and insert -- diaphragm --.

Signed and Sealed this

Twenty-eighth Day of February, 2006

JON W. DUDAS
*Director of the United States Patent and Trademark Office*